(12) United States Patent
Sekiguchi (10) Patent No.: US 11,356,671 B2
(45) Date of Patent: Jun. 7, 2022

(54) IMAGE CAPTURING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Tomohiro Sekiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 15/930,830

(22) Filed: May 13, 2020

(65) Prior Publication Data

US 2020/0366898 A1    Nov. 19, 2020

(30) Foreign Application Priority Data

May 16, 2019 (JP) .............................. JP2019-093133

(51) Int. Cl.
*H04N 19/146* (2014.01)
*H04N 5/232* (2006.01)
*H04N 19/114* (2014.01)

(52) U.S. Cl.
CPC ....... *H04N 19/146* (2014.11); *H04N 5/23206* (2013.01); *H04N 19/114* (2014.11)

(58) Field of Classification Search
CPC . H04N 19/146; H04N 19/114; H04N 5/23206
USPC ......................................................... 382/232
See application file for complete search history.

(56) References Cited

FOREIGN PATENT DOCUMENTS

JP          5803814 B2     11/2015

*Primary Examiner* — On S Mung
(74) *Attorney, Agent, or Firm* — Cowan, Liebowitz & Latman, P.C.

(57) ABSTRACT

An image capturing apparatus comprises an image capturing unit, a compressing unit which compression-encodes captured video data in units of GOPs using a first compression method which generates encoded data of a closed GOP or a second compression method which generates encoded data of an open GOP; and a control unit which performs control to record the video data on a plurality of mediums, wherein the control unit records, on a first medium, the video data acquired before a recording start instruction is input, and records, on a second medium, the video data acquired by the image capturing unit in response to the recording start instruction being input, wherein the control unit performs control to record, on the first medium, the video data compression-encoded using the first compression method.

11 Claims, 8 Drawing Sheets

IMAGE CAPTURING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image capturing apparatus, a control method thereof, and a non-transitory computer-readable storage medium.

Description of the Related Art

In general, an image capturing apparatus or a moving-image recording apparatus represented by a digital camera starts recording in response to an image-capturing start instruction from an operator, and ends the recording in response to an image-capturing end instruction from the operator. However, there are cases in which it is difficult to predict the timing of an important scene and the operator may fail to provide an image-capturing start instruction in a timely manner, and thus be unable to capture an image of the important scene.

As a countermeasure to such a problem, it is possible to continuously record a moving image. Japanese Patent No. 5803814 proposes a technology for simultaneously recording multiplexed data in which encoded video data and audio data are multiplexed on a plurality of recording mediums, without a decrease in the quality of the video data and the audio data, at times immediately after the recording on the respective recording mediums is started and immediately before the recording stops while suppressing the circuit size.

However, in the conventional example, simultaneous recording can only be started after an image-capturing start instruction is accepted from the operator. Thus, there is still a possibility of the operator failing to capture an image at the time when the operator provides an image-capturing instruction.

SUMMARY OF THE INVENTION

The present invention, which has been made in view of such a problem, provides a technique for reliably recording a video image at an input timing of a recording start instruction, on at least one of two recording mediums in which the one of the two recording mediums has received an instruction input to start recording on the one recording medium while encoded video data is being recorded on the other of the two recording mediums.

According to a first aspect of the invention, there is provided an image capturing apparatus comprising: an image capturing unit configured to capture an image of a subject; a compressing unit configured to compression-encode video data acquired by the image capturing unit in units of group of pictures (GOP), wherein the compressing unit performs compression-encoding using a first compression method or a second compression method, the first compression method generating encoded data of a GOP that is decodable without referring to a previous GOP, and the second compression method generating encoded data of a GOP that is decoded with reference to a previous GOP; and a control unit configured to perform control to record the video data acquired by the image capturing unit on a plurality of recording mediums, wherein the control unit performs control to record, on a first recording medium of the plurality of recording mediums, the video data acquired by the image capturing unit before a recording start instruction is input, and performs control to record, on a second recording medium of the plurality of recording mediums, the video data acquired by the image capturing unit in response to the recording start instruction being input, wherein the control unit performs control to record, on the first recording medium, the video data compression-encoded using the first compression method before the recording start instruction is input.

According to a second aspect of the invention, there is provided a method of controlling an image capturing apparatus, the method comprising: capturing an image of a subject using an image capturing unit; compression-encoding video data acquired by the image capturing unit in units of group of pictures (GOP), wherein in the compression-encoding, a first compression method or a second compression method is used, the first compression method generating encoded data of a GOP that is decodable without referring to a previous GOP, and the second compression method generating encoded data of a GOP that is decoded with reference to a previous GOP; and performing control to record the video data acquired by the image capturing unit on a plurality of recording mediums, wherein in the performing control, on a first recording medium of the plurality of recording mediums, the video data acquired by the image capturing unit before a recording start instruction is input is recorded, and, on a second recording medium of the plurality of recording mediums, the video data acquired by the image capturing unit in response to the recording start instruction being input is recorded, wherein in the performing control, on the first recording medium, the video data compression-encoded using the first compression method before the recording start instruction is input is recorded.

According to a third aspect of the invention, there is provided a non-transitory computer-readable storage medium storing a program which, when read and executed by a computer, causes the computer to execute the steps of a method of controlling an image capturing apparatus, the method comprising: capturing an image of a subject using an image capturing unit; compression-encoding video data acquired by the image capturing unit in units of group of pictures (GOP), wherein in the compression-encoding, a first compression method or a second compression method is used, the first compression method generating encoded data of a GOP that is decodable without referring to a previous GOP, and the second compression method generating encoded data of a GOP that is decoded with reference to a previous GOP; and performing control to record the video data acquired by the image capturing unit on a plurality of recording mediums, wherein in the performing control, on a first recording medium of the plurality of recording mediums, the video data acquired by the image capturing unit before a recording start instruction is input is recorded, and, on a second recording medium of the plurality of recording mediums, the video data acquired by the image capturing unit in response to the recording start instruction being input is recorded, wherein in the performing control, on the first recording medium, the video data compression-encoded using the first compression method before the recording start instruction is input is recorded.

According to the present invention, when a recording start instruction is provided to one recording medium of a plurality of recording mediums while video data is being recording on another recording medium of the recording mediums, an image captured at the time of the recording start instruction can be reliably recorded.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
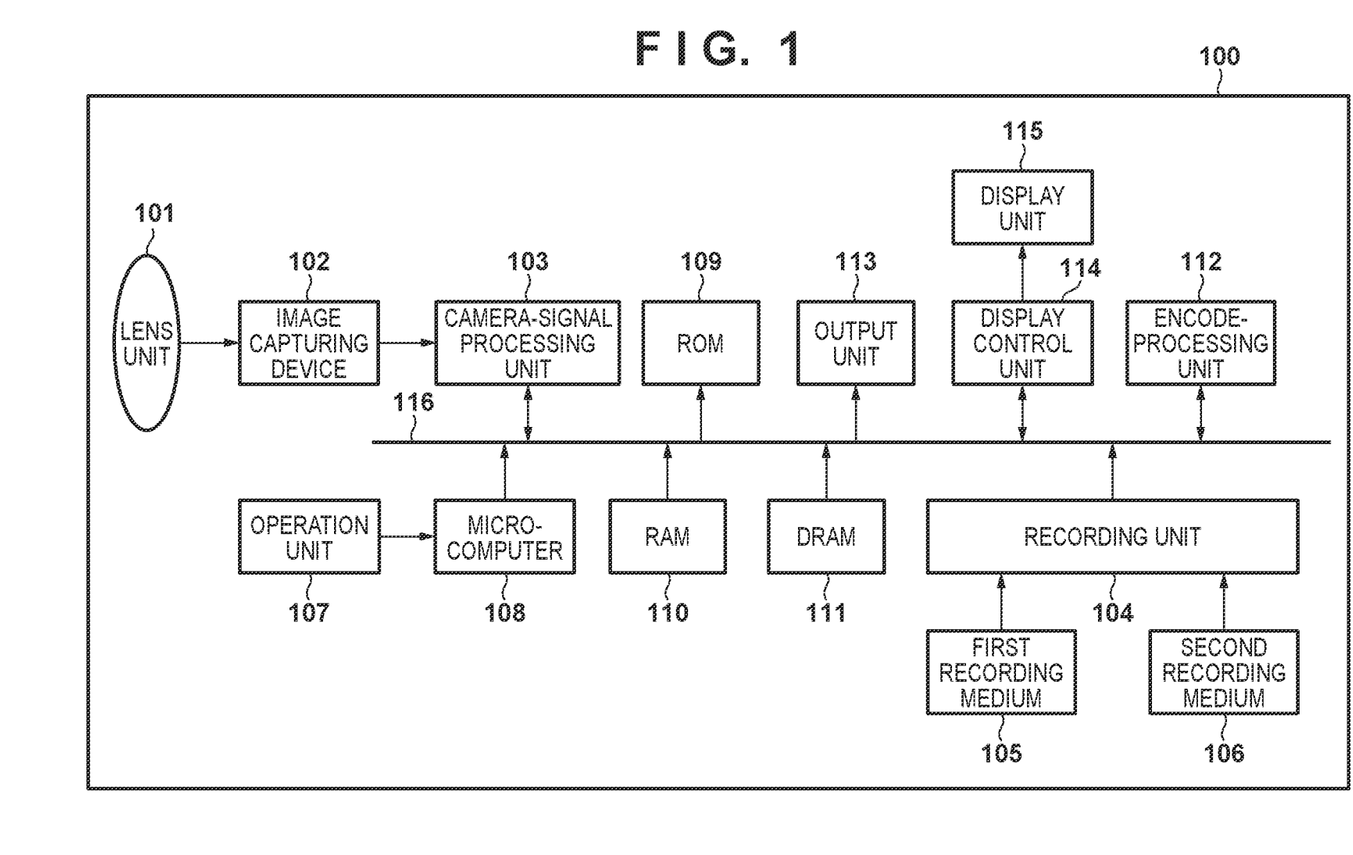
FIG. 1 is a block diagram illustrating the configuration of an image capturing apparatus according to an embodiment.

FIG. 1 is block diagram illustrating the configuration of a moving-image recording apparatus (or an image capturing apparatus) according to an embodiment, represented by a digital video camera. Note that audio data sampled by a microphone (not illustrated) is encoded according to a known procedure. The encoded audio data is then integrated with encoded data of a moving image and recorded as a single file. Since this embodiment focuses on the recording of a moving image, further description on processing related to the recording of audio data is omitted.

A lens unit 101 of a moving-image recording apparatus 100 includes fixed lenses for condensing light, variable magnification lenses, correction lenses, an aperture, and the like. The correction lenses have a function of correcting an image forming position that has moved as a result of the variable magnification lenses moving and a function of making focus adjustment. The lens unit 101 also forms an optical image of a subject on an image-capturing surface of an image capturing device 102.

The image capturing device 102 is, for example, a complementary metal-oxide semiconductor (CMOS) image sensor or the like, and converts the light intensity of the optical image formed on its surface to a charge quantity, and generates an image signal. Moreover, the image capturing device 102 outputs an image signal of a 4K image (4096 horizontal pixels and 2160 vertical pixels) per frame at a rate of 60 frames per second.

A camera-signal processing unit 103 performs predetermined processing (such as A/D conversion and image development) on the image signals acquired from the image capturing device 102, and outputs image data.

An encode-processing unit 112 generates encoded data by encoding the 4K moving image data according to an encoding format, such as H.264. A recording unit 104 records the moving image data encoded by the encode-processing unit 112 on a first recording medium 105 or a second recording medium 106. In this embodiment, the first recording medium 105 and the second recording medium 106 are both memory cards of the same type (for example, SD cards). The recording unit 104 manages the moving image files recorded on the first recording medium 105 and the second recording medium 106 according to a predetermined file system.

As the file system of the first recording medium 105 and the second recording medium 106, exFAT is used. The recording volume of the first recording medium 105 and the second recording medium 106 is, for example, several hundred gigabytes to several terabytes, which is smaller than the upper limit of the file size prescribed by exFAT. For this reason, if the size of the moving image file to be recorded is too large, handling of the file becomes difficult. Therefore, the recording unit 104 according to this embodiment divides the moving image data between moving image files on the first recording medium 105 and the second recording medium 106 with each data set corresponding to a predetermined time, for example, 30 minutes or less. That is, when recording of the moving image is continued, a closing process for closing a file and an opening process for opening a new file is performed every 30 minutes.

The encode-processing unit 112 compression-encodes the respective frames in the moving image data into group of pictures (GOP) units through inter-frame prediction coding. In this embodiment, an MXF format is applied as a container format of a moving image file. However, another file container, such as Advanced Video Coding High Definition (AVCHD) or MP4, may be applied. When the encode-processing unit 112 compresses a 4K moving image, the encoding is performed on the presumption that one GOP consists of 30 frames.

An operation unit 107 is a unit operated by a user for input, and operations made thereon are input to a microcomputer 108. The operation unit 107 includes various buttons and switches, such as a START/STOP button for instructing the recording of a moving image, a menu button for instructing a setting change, and a status button for instructing the display of a status. Moreover, the operation unit 107 may include a touch screen.

The microcomputer 108 includes a CPU and the like, and comprehensively controls the moving-image recording apparatus 100. A ROM 109 is a non-volatile memory, such as a flash ROM. The ROM 109 stores programs to be executed by the microcomputer 108 and various parameters. A RAM 110 is a volatile memory that is used as a work area by the microcomputer 108. Furthermore, a DRAM 111 is used to temporarily store image data that is a processing target and processing results of the camera-signal processing unit 103, the encode-processing unit 112, and the recording unit 104. The DRAM 111 has a volume large enough for storing encoded data of several GOPs. Specifically, the camera-signal processing unit 103 stores image data, which has been subjected to image development, in the DRAM 111. The encode-processing unit 112 reads and compresses a series of image data stored in the DRAM 111, and writes the encoded video data in a recording buffer secured in the DRAM 111. The recording unit 104 sequentially reads the encoded video data items stored in the recording buffer in the DRAM 111, and records the encoded video data items in the first recording medium 105 and the second recording medium 106. Note that the recording buffer has a volume large enough to store encoded data of multiple GOPs.

An output unit 113 outputs, to an external device, an HDMI (trademark) signal or an SDI signal of an image signal in a predetermined digital format.

A display control unit 114 is a device that controls the image display of a display unit 115, superimposes information such as various setting menus, titles, and the time on the image data, and displays this on the display unit 115 according to an instruction from the microcomputer 108. The display unit 115 includes, for example, a liquid crystal panel, and displays an image under the control of the display control unit 114. A bus 116 is used for transmitting data and control signals between the above-described components of the moving-image recording apparatus 100.

Moving-image recording processing performed in the moving-image recording apparatus 100 will now be described. A user can operate the operation unit 107 to change the recording mode to a continuous recording mode via the setting menu. When the recording mode is changed to the continuous recording mode, the moving-image recording apparatus 100 starts backup continuous recording on the first recording medium 105. When the user presses the START/STOP button of the operation unit 107 for moving image recording while continuous recording is being performed on the first recording medium 105, the moving-image recording apparatus 100 starts recording encoded video data on the second recording medium 106. When the user presses the START/STOP button again, the moving-image recording apparatus 100 ends the recording on the second recording medium 106.

Figure 2A:
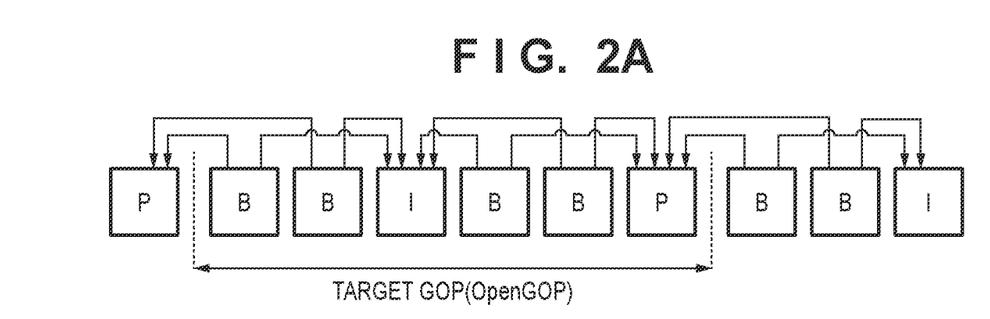
FIGS. 2A and 2B illustrate different types of GOPs.
Figure 2B:
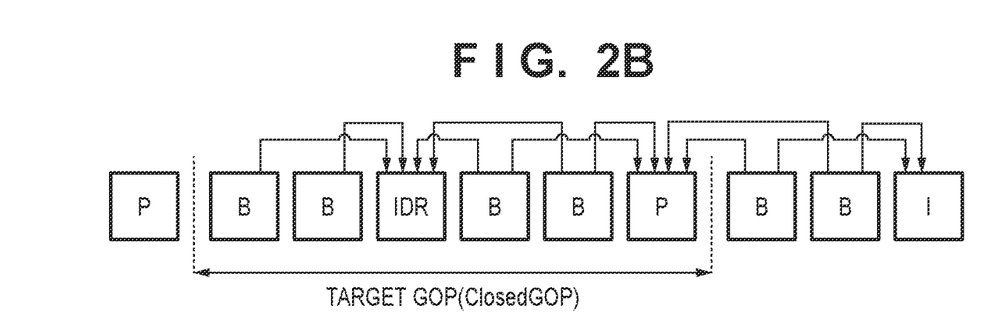

Different types of GOPs will be described with reference to FIGS. 2A and 2B. FIG. 2A illustrates an example of an open GOP, and FIG. 2B illustrates an example of a closed GOP.

In the image coding method of H.264, there are three types of coded images in a stream: an I picture, a P picture, and a B picture. The I picture is decoded independently without reference to other pictures. The P picture is acquired by applying forward prediction coding between pictures, and uses one past I picture or P picture as a reference picture for prediction coding. The B picture is coded using bidirectional prediction. The B picture uses two pictures, one past picture and one future picture. Note that, in H264/AVC, the reference pictures may be two past pictures or two future pictures.

In general, the I picture has the largest data volume, the P picture has the second largest data volume, and the B picture has the smallest data volume. Therefore, it can be said that as the number of B pictures is increased, compression efficiency is increased. However, a decrease in the number of I pictures leads to a decrease in the number of starting points from which the encoded video image can be reproduced.

The target GOP illustrated in FIG. 2A includes six pictures: a B picture, a B picture, an I picture, a B picture, a B picture, and a P picture, in this order. The leading two B pictures of the target GOP need to be decoded by referring to the last P picture in the GOP immediately before the target GOP. In this way, a target GOP including a B picture that refers to a picture in the previous GOP is referred to as an "open GOP". In the case where the leading GOP of a multiplexed stream is an open GOP, the two leading B pictures cannot be decoded. Thus, when the encoded video data is reproduced from an open GOP, a frame drop of two frames occurs.

The sequence of pictures in the target GOP illustrated in FIG. 2B is the same as that of the target GOP in FIG. 2A. However, the two leading B pictures refer to the subsequent I picture (IDR frame). In this way, a target GOP that can be decoded without reference to a picture in a previous GOP is referred to as a "closed GOP". In the case where the leading GOP of the multiplexed stream is a closed GOP, there is an advantage in that a frame drop does not occur at the leading frames while the encoded video data is being reproduced. Note that the GOP subsequent to the target GOP in FIG. 2B is an open GOP because it refers to a picture in the target GOP.

Furthermore, in H.264, the reference picture of the P picture is not limited to the I picture or P picture immediately before. Moreover, the reference picture of the B picture in the past direction is not limited to the I picture or P picture immediately before. In this way, in H.264, there are cases in which the P picture or the B picture skips an I picture in the past direction to refer to a picture further in the past than the I picture. That is, in such cases, the I picture does not serve as an anchor. Therefore, in H.264, the I picture serving as an anchor is specifically designated as an IDR picture. In the H.264, the GOP that starts from the IDR picture is a closed GOP.

In general, in an open GOP, the two leading B pictures refer to the last P picture in the GOP immediately before. Therefore, the compression efficiency of an open GOP is considerably higher than that of a closed GOP. In other words, when the bit rates (compression rates) are the same, the image quality of the open GOP may be slightly higher than that of the closed GOP.

Figure 3:
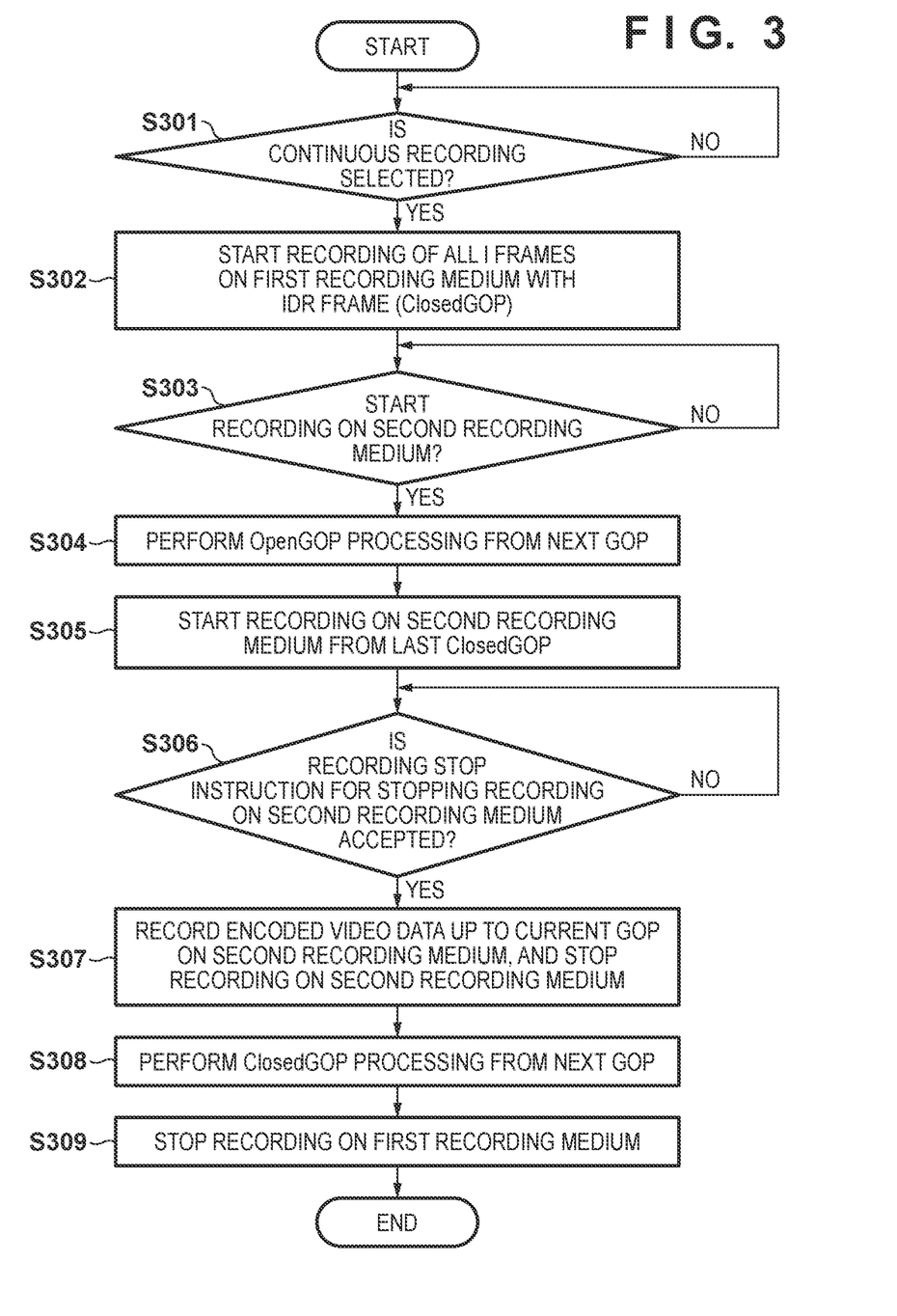
FIG. 3 is a flowchart of recording processing according to a first embodiment.

FIG. 3 is an operation flowchart of continuous recording according to this embodiment.

In step S301, the microcomputer 108 displays a menu screen on the display unit 115, and waits for the user to select the continuous recording mode via the operation unit 107. If the microcomputer 108 determines that the continuous recording mode has been selected, the process proceeds to step S302. In step S302, the microcomputer 108 controls the encode-processing unit 112 to perform compression-encoding (in a closed GOP) by designating all I pictures as IDR pictures, and starts recording of the encoded video data on the first recording medium 105.

This embodiment describes an example of a process in which compression-encoding (in a closed GOP) is performed by designating all I pictures as IDR pictures when recording is performed on the first recording medium 105. Alternatively, for example, an I picture may be designated as an IDR picture every second.

In step S303, the microcomputer 108 determines whether or not the START/STOP button has been pressed by the user via the operation unit 107. If it is determined that the START/STOP button has been pressed, the microcomputer 108 determines that a recording start instruction for starting recording on the second recording medium 106 has been provided. The microcomputer 108 then causes the process to proceed to step S304.

In step S304, the microcomputer 108 controls the encode-processing unit 112 to perform compression-encoding (in an open GOP) by designating the IDR pictures as I pictures starting from the GOP subsequent to the GOP including the frame corresponding to the timing of the recording start instruction. Then, in step S305, the microcomputer 108 starts recording on the second recording medium 106 from the leading frame of the last closed GOP (from the IDR picture) stored in the DRAM 111. That is, encoded video data is recorded on both the first recording medium 105 and the second recording medium 106 starting from the GOP including the frame corresponding to the timing of the recording start instruction. In this embodiment, the encode-processing unit 112 is not able to simultaneously perform multiple types of compression-encoding. Therefore, the same encoded video data compression-encoded by the encode-processing unit 112 is recorded on both the first recording medium 105 and the second recording medium 106.

In step S306, the microcomputer 108 determines whether or not the user has pressed the START/STOP button again via the operation unit 107 during recording of the encoded video data on the first recording medium 105 and the second recording medium 106, as described above. If the START/STOP button has been pressed again and an instruction to stop recording has been made, the microcomputer 108 causes the process to proceed to step S307. In step S307, the microcomputer 108 records the encoded video data up to the GOP corresponding to the encoded video data currently subjected to encoding on the second recording medium 106, and then stops the recording on the second recording medium 106. That is, the encoded video data up to the GOP including the frame corresponding to the timing of the recording stop instruction is recorded on the first recording medium 105 and the second recording medium 106, and the subsequent GOPs are recorded only on the first recording medium 105. Then, in step S308, the microcomputer 108 controls the encode-processing unit 112 to perform the compression-encoding in a closed GOP from the next GOP and record data on the first recording medium 105. Then, in step S309, the microcomputer 108 stops the recording on the first recording medium 105 in response to a recording stop instruction to stop recording on the first recording medium 105 (instruction for cancelling the recording mode) input from the setting menu screen operated by the user via the operation unit 107.

Figure 4A:
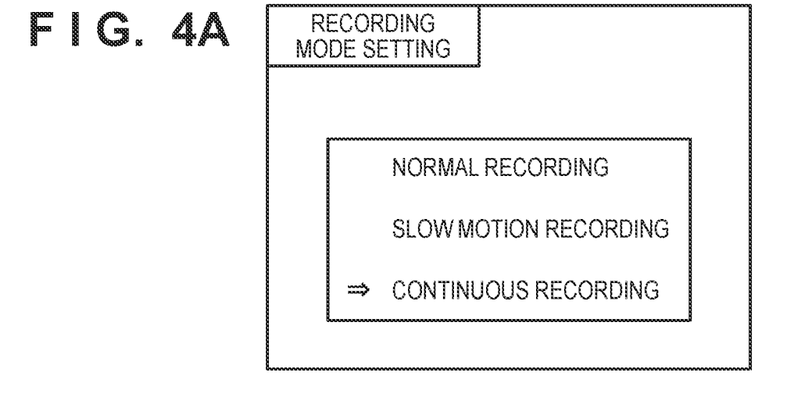
FIGS. 4A to 4C illustrate display examples of a menu screen according to an embodiment.

FIG. 4A illustrates a display example of the menu screen displayed in step S301. By selecting "continuous recording" on the menu screen in FIG. 4A, the recording mode switches from a normal recording mode to a continuous recording mode illustrated in FIG. 4B. In response to the detection of an instruction input indicating the selection of "REC (record)" on the "continuous recording" menu screen illustrated in FIG. 4B, the microcomputer 108 starts continuous recording of the encoded video data on the first recording medium 105. Note that, when an instruction input indicating the selection of "STBY (stand-by)" illustrated in FIG. 4B is detected, the microcomputer 108 stops the recording of the encoded video data on the first recording medium 105.

Figure 5:
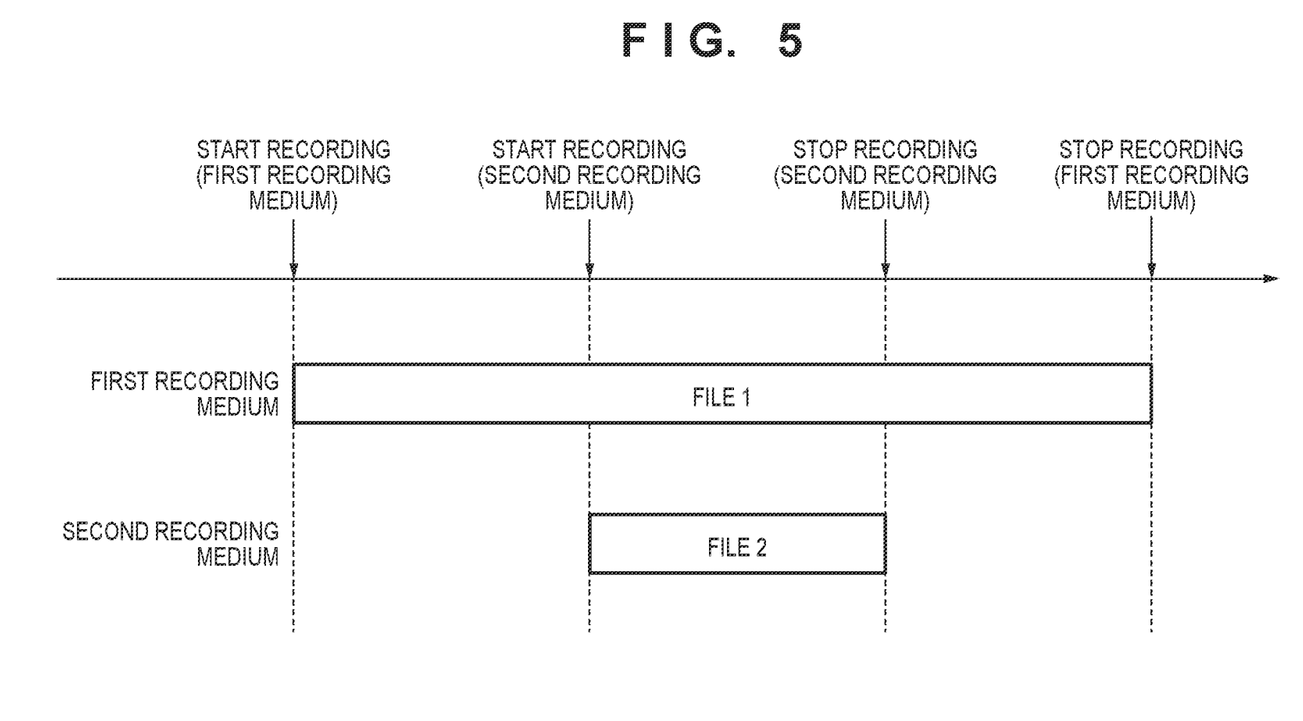
FIG. 5 illustrates an example of a recording operation on a first recording medium and a second recording medium in a continuous recording mode according to the first embodiment.

FIG. 5 illustrates recording examples on the first recording medium and the second recording medium in the continuous recording mode.

Figure 4B:
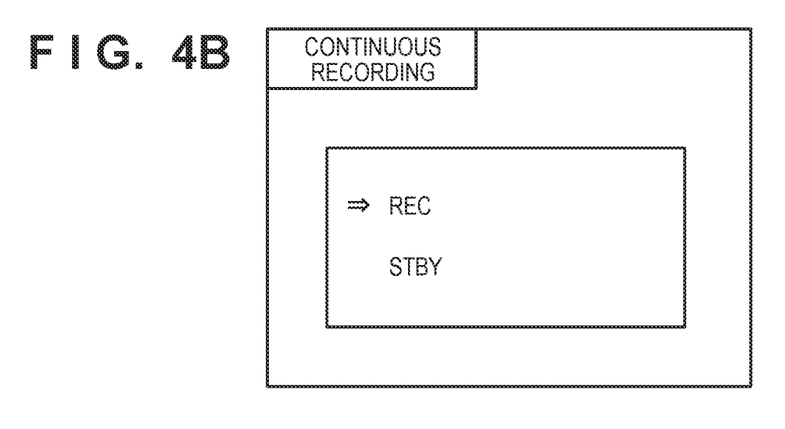

In response to selecting "continuous recording" in FIG. 4A and selecting "REC" in FIG. 4B while the recording on the first recording medium 105 and the second recording medium 106 is stopped, the microcomputer 108 controls the recording unit 104 to open a "file 1" on the first recording medium 105, and start recording the encoded video data on the first recording medium 105.

Next, when the pressing of the START/STOP button is detected, that is, when a recording start instruction to start recording on the second recording medium 106 is received, the recording unit 104 opens a file 2 on the second recording medium 106, and starts recording the encoded video data on the second recording medium 106. At this time, simultaneous recording is carried out on the first recording medium 105 and the second recording medium 106.

Upon receiving a recording stop instruction to stop the recording on the second recording medium 106 via the START/STOP button, the recording of the encoded video data on the second recording medium 106 stops, and the file 2 is closed.

In response to "STBY" in FIG. 4B being selected and a recording stop instruction to stop the recording on the first recording medium 105 being accepted, the recording of the encoded video data on the first recording medium 105 stops, and the file 1 is closed.

As described above in this embodiment, when an instruction is input to start the recording via the START/STOP button operated by the user in the continuous recording mode, recording on the second recording medium 106 starts from the closed GOP immediately before that corresponding to the timing of the instruction input. Thus, an image corresponding to the timing of the instruction input is recorded on the second recording medium 106, and thus the problem of missing the image capturing timing can be avoided. Furthermore, since the leading GOP of the file generated on the second recording medium 106 has a closed GOP format, a frame drop does not occur even when the encoded video data is reproduced from the leading GOP. Furthermore, the leading GOP on the second recording medium 106 has a closed GOP format, but after the timing of the input of an instruction, the video data is encoded as both an open GOP and a closed GOP at a predetermined cycle. Therefore, highly efficient encoding can be expected, in comparison to a case in which only closed GOPs are recorded.

Second Embodiment

In the second embodiment, described is a method for starting recording of encoded video data from a predetermined time (three seconds in this embodiment) before the time when the user provides a recording start instruction via the START/STOP button.

The apparatus configuration is the same as that illustrated in FIG. 1 in the first embodiment. The processing content of the microcomputer 108 will be described with reference to the flowchart in FIG. 6. Note that, in the second embodiment, the recording buffer secured in the DRAM 111 has a sufficient volume.

Figure 4C:
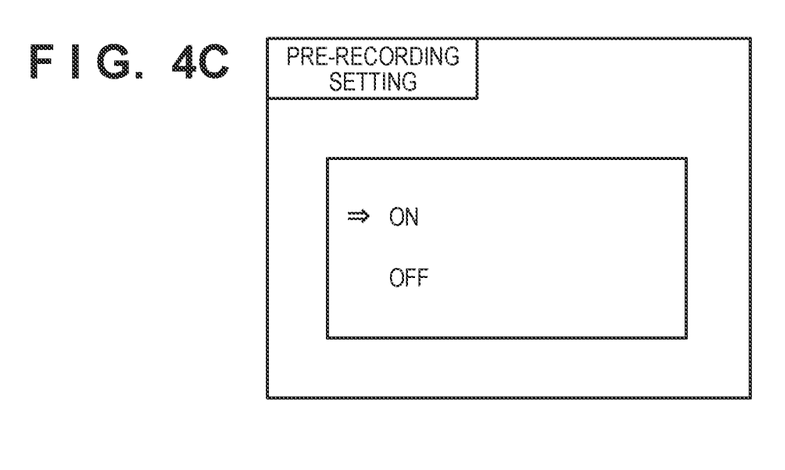
Figure 6:
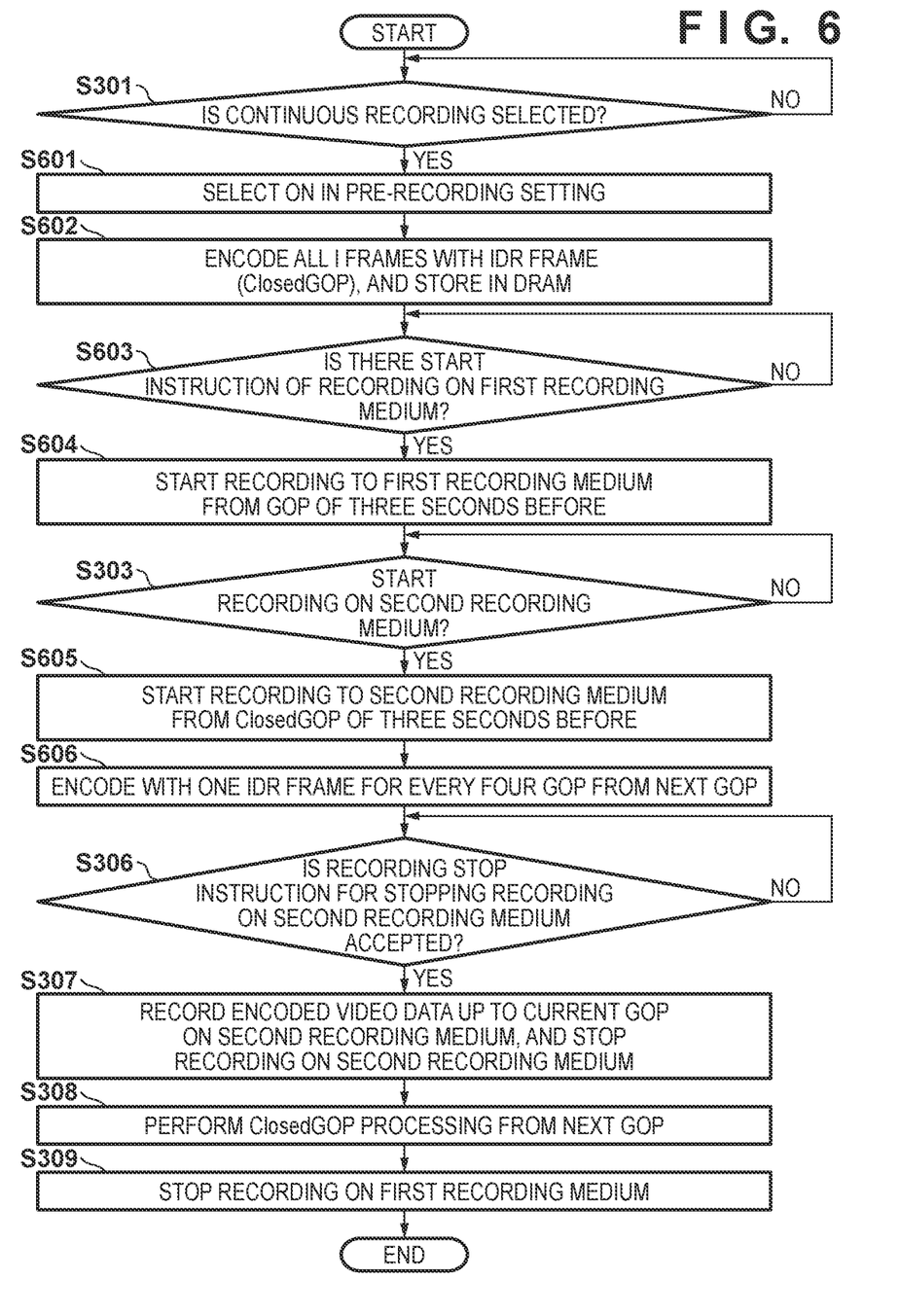
FIG. 6 is a flowchart of recording processing according to a second embodiment.

In step S301, the microcomputer 108 displays a menu screen illustrated in FIG. 4A on the display unit 115, and waits for the user to select "continuous recording" via the operation unit 107. If it is determined that the continuous recording mode has been selected, the microcomputer 108 causes the process to proceed to step S601. In step S601, the microcomputer 108 displays a menu for a pre-recording setting illustrated in FIG. 4C on the display unit 115, and accepts an instruction from the user. In the following description, it is presumed that the user has selected "ON" in the pre-recording setting.

In step S602, the microcomputer 108 starts controlling the encode-processing unit 112 to perform compression-encoding (in a closed GOP) by designating all I pictures as IDR pictures, and temporarily stores the encoded video data in the recording buffer of the DRAM 111. However, at this stage, recording on the first recording medium 105 is not performed by the recording unit 104.

In step S603, the microcomputer 108 displays an accepting menu for a start instruction of continuous recording illustrated in FIG. 4B, and waits for a start instruction ("REC" instruction) from the user. For the time that the "REC" instruction is not input, encoded data is stored in the recording buffer, but the encoded data is deleted after 10 seconds. In step S603, if the microcomputer 108 determines the input of a start instruction, the microcomputer 108 causes the process to proceed to step S604.

In step S604, the microcomputer 108 starts recording, on the first recording medium 105, from the encoded video data stored in the recording buffer, which has a ring structure, of 3 seconds before when the recording start instruction was accepted (which is six GOPs before in the case where one GOP is 30 frames and image capturing is performed at a rate of 60 frames per second). Since the recording is made in GOP units, to be exact, the recording of the encoded video data starts from the leading picture in the GOP including a picture corresponding to one three seconds ago. Note that, in the description below, the expression "recording the encoded data from three seconds before" is to be understood as it was described above.

In step S303, the microcomputer 108 determines whether or not the START/STOP button has been pressed by the user via the operation unit 107. If it is determined that the START/STOP button has been pressed, the microcomputer 108 determines that a recording start instruction for starting recording on the second recording medium 106 has been provided. The microcomputer 108 then causes the process to proceed to step S605.

In step S605, the microcomputer 108 starts recording, on the second recording medium 106, the encoded data from three seconds before the timing at which pressing of the START/STOP button was determined.

In step S606, the microcomputer 108 controls the encode-processing unit 112 to perform compression-encoding so that, in every four subsequent GOPs, one GOP is designated as a closed GOP and the other three GOPs are designated as open GOPs. In the case where one GOP is 30 frames and image capturing is performed at a rate of 60 frames per second, a closed GOP is designated every two seconds and the other GOPs are designated as open GOPs.

Since the steps after step S606 are the same as steps S306 to S309 in the first embodiment, detailed descriptions of these steps are omitted here.

Third Embodiment

In the third embodiment, described is a control method of dividing a file while the encoded video data is being recorded on both the first recording medium 105 and the second recording medium 106.

Figure 7:
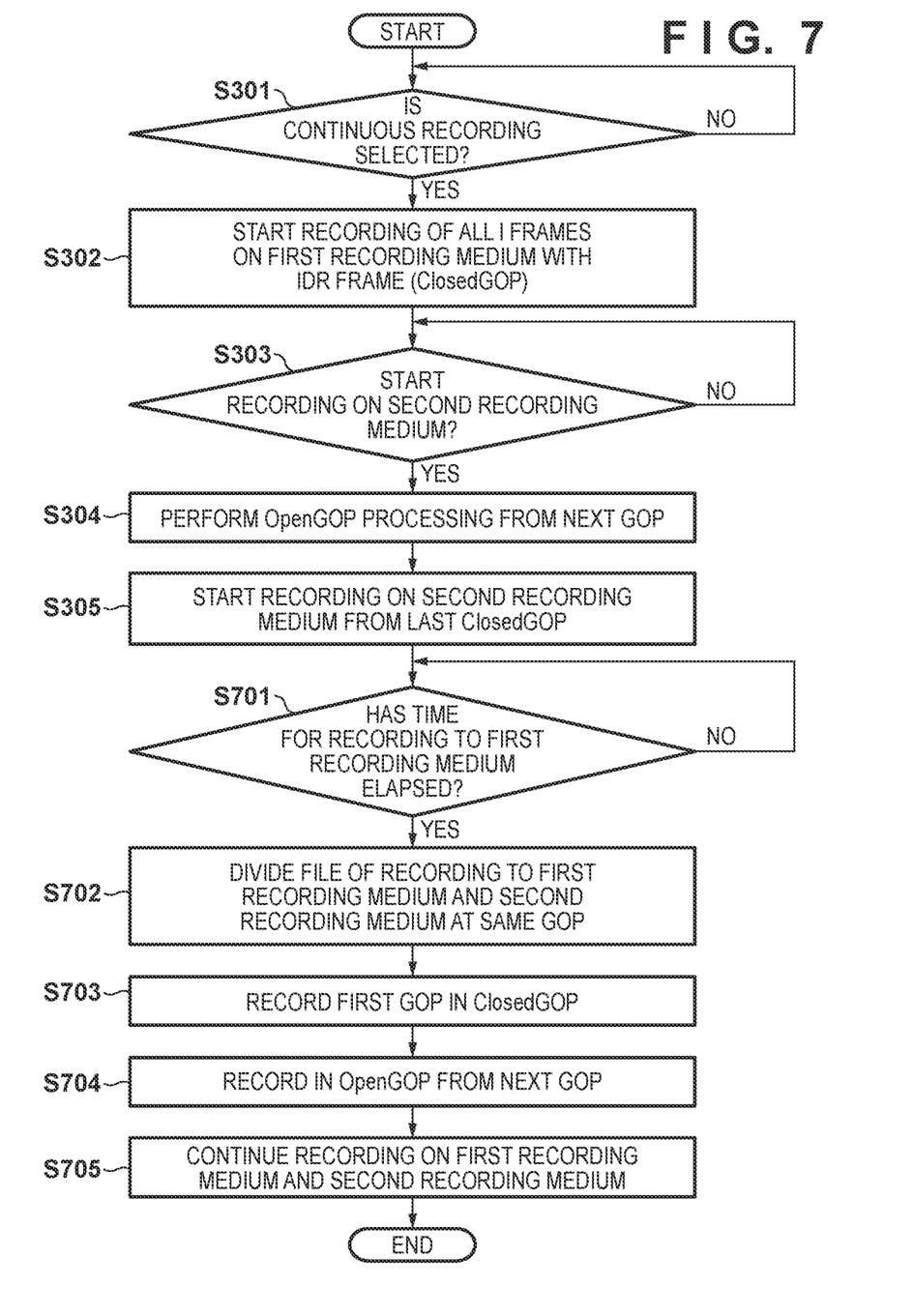
FIG. 7 is a flowchart of recording processing according to a third embodiment.

FIG. 7 is an operation flowchart of continuous recording according to the third embodiment.

The basic configuration of the apparatus according to the third embodiment is the same as that according to the first embodiment. The flow up to the start of recording of the encoded video data on the first recording medium 105 and the second recording medium 106 is the same as steps S301 to S305 in FIG. 3. Therefore, the flow up to the start of recording will be omitted here.

In step S701, the microcomputer 108 determines whether or not 30 minutes has elapsed from the start of recording or the time of the previous file division for the encoded video data on the first recording medium 105. This determination is equivalent to determining whether or not the moving image file currently being recorded on the first recording medium 105 is 30 minutes long. If the determination result is "YES", the microcomputer 108 causes the process to proceed to step S701.

In step S701, the microcomputer 108 starts controlling the recording unit 104 to perform file division. In this embodiment, an example in which a file is divided depending on the time elapsed from the start of recording or the last file division is described, but, in the case where a recording medium uses, for example, an FAT32 file system, file division may be performed immediately before the size of the file reaches an upper limit (4 GB) of the file system.

In step S702, the microcomputer 108 controls the recording unit 104 to record up to the same GOP on the first recording medium 105 and the second recording medium 106, and then closes the file.

In step S703, the microcomputer 108 controls the encode-processing unit 112 to perform compression-encoding on the next GOP in a closed GOP. Then, in step S704, the microcomputer 108 performs control to subsequently perform the compression-encoding in open GOPs, and controls the recording unit 104 to open files on the first recording medium 105 and the second recording medium 106 for the following round of moving image recording.

In step S705, the microcomputer 108 controls the recording unit 104 to restart the recording of the encoded video data on the first recording medium 105 and the second recording medium 106 from the closed GOP stored in the DRAM 111.

The subsequent flow is the same as steps S306 to S309 in FIG. 3.

Figure 8:
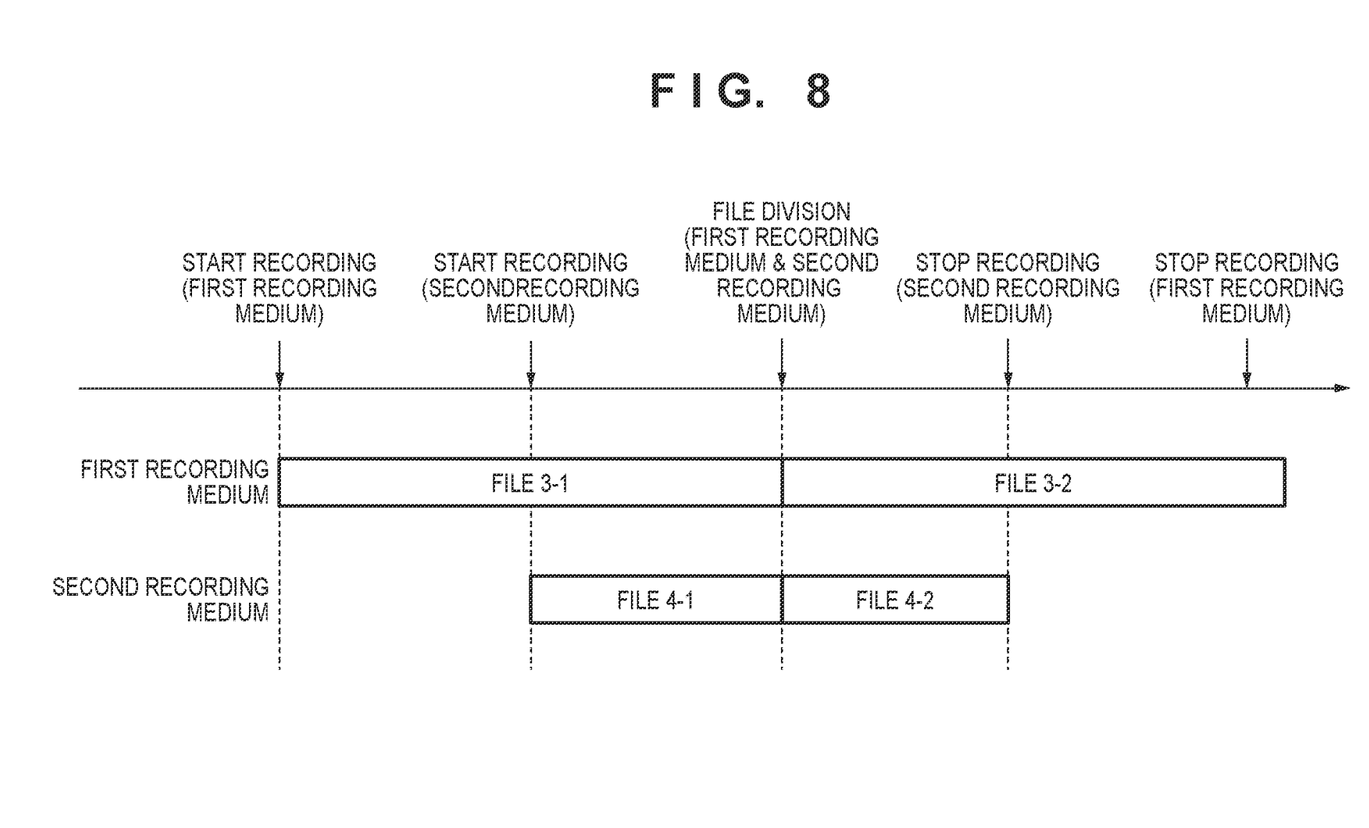
FIG. 8 illustrates an example of a recording operation on a first recording medium and a second recording medium in a continuous recording mode according to the third embodiment.

FIG. 8 illustrates a recording operation on the first recording medium 105 and the second recording medium 106 in the continuous recording mode and file configurations according to the third embodiment.

In response to continuous recording as illustrated in FIG. 4A being selected and "REC" as illustrated in FIG. 4B being selected when recording to the first recording medium 105 and the second recording medium 106 is stopped, the recording unit 104 opens a file 3-1 and starts recording encoded video data on the first recording medium 105.

Next, when it is detected that the START/STOP button has been pressed, that is, when a recording start instruction for starting recording on the second recording medium 106 has been provided, the recording unit 104 opens a file 4-1, and starts recording the encoded video data on the second recording medium 106. At this time, simultaneous recording is carried out on the first recording medium 105 and the second recording medium 106.

Thirty minutes after the recording has started, the microcomputer 108 starts controlling the recording unit 104 to perform file division. As a result, the files 3-1 and 4-1 which are currently recording are closed. Next, the recording unit 104 opens a file 3-2 and restarts the recording of the encoded video data on the first recording medium 105. In addition, the recording unit 104 opens a file 4-2 and restarts the recording of the encoded video data on the second recording medium 106.

Upon accepting a recording stop instruction for stopping the recording on the second recording medium 106 via the START/STOP button, the recording of the encoded video data on the second recording medium 106 stops, and the file 4-2 is closed.

Upon accepting a recording stop instruction for stopping the recording on the first recording medium 105 due to "STBY" as illustrated in FIG. 4B being selected, the recording of the encoded video data on the first recording medium 105 stops, and the file 3-2 is closed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-093133, filed May 16, 2019 which is hereby incorporated by reference herein in its entirety.

What is claimed is:

1. An image capturing apparatus comprising:
an image sensor configured to capture an image of a subject;
a memory and at least one processor which function as:
a compressing unit configured to compression-encode video data acquired by the image sensor in units of group of pictures (GOP), wherein the compressing unit performs compression-encoding using a first compression method or a second compression method, the first compression method generating encoded data of a GOP of interest by referring only to frames in the GOP of interest to be encoded without referring to a previous GOP, and the second compression method generating encoded data of the GOP of interest by referring not only to frames in the GOP of interest but also to frames in the previous GOP; and
a control unit configured to perform control to record the video data acquired by the image sensor on a plurality of recording mediums, wherein the control unit performs control to record, on a first recording medium of the plurality of recording mediums, the video data acquired by the image sensor before a recording start instruction for a second recording medium of the plurality of recording mediums is input, and performs control to record, on the second recording medium, the video data acquired by the image sensor in response to the recording start instruction for the second recording medium being input,
wherein the control unit performs control to record, on the first recording medium, the video data in which all of GOPs are compression-encoded using the first compression method before the recording start instruction for the second recording medium is input, and
to record, on the first recording medium and the second recording medium, the video data including video data compression-encoded using the second compression method after the recording start instruction is input.

2. The image capturing apparatus according to claim 1, wherein the control unit performs control to record, on the first recording medium, the video data in which all of GOPs are compression-encoded using the first compression method before the recording start instruction is input for the second recording medium, and performs control to record, on the first recording medium and the second recording medium, the video data in which GOP compression-encoded using the first compression method and GOP compression-encoded using the second compression method are mixed at a predetermined cycle after the recording start instruction for the second recording medium is input.

3. The image capturing apparatus according to claim 1, wherein the control unit performs control to compression-encode, using the first compression method, a GOP including a frame corresponding to a time at which the recording start instruction is input, and record the compression-encoded GOP, on the first recording medium and the second recording medium.

4. The image capturing apparatus according to claim 3, wherein the control unit performs control to compression-encode, using the second compression method, subsequent GOPs following the GOP including the frame corresponding to the time at which the recording start instruction is input, and record the compression-encoded subsequent GOPs.

5. The image capturing apparatus according to claim 1, wherein, while video data is recorded on both the first recording medium and the second recording medium, when a recording stop instruction for the second recording medium is input, the control unit performs control to stop recording on the second recording medium and continue recording the video data on the first recording medium, and after the recording on the second recording medium has been stopped, the control unit performs control to record the video data in which all of GOPs are compression-encoded using the first compression method on the first recording medium.

6. The image capturing apparatus according to claim 1, wherein, when the video data is recorded on both the first recording medium and the second recording medium, the same video data compression-encoded by the compressing unit using the same compression method is recorded.

7. The image capturing apparatus according to claim 1, wherein, when a time length represented by the encoded video data recorded on the first recording medium reaches a predetermined value while the encoded video data is being recorded on both the first recording medium and the second recording medium, the control unit
performs a closing process for closing files recorded on the first recording medium and the second recording medium, performs an opening process for opening new files to be recorded on the first recording medium and the second recording medium, and controls the compressing unit to perform encoding using the first compression method on a leading GOP recorded in a file immediately after the opening process, and controls the compressing unit to perform encoding using a compression method including at least the second compression method on GOPs subsequent to the leading GOP.

8. A method of controlling an image sensor, the method comprising:

capturing an image of a subject using an image capturing unit;

compression-encoding video data acquired by the image sensor in units of group of pictures (GOP), wherein in the compression-encoding, a first compression method or a second compression method is used, the first compression method generating encoded data of a GOP of interest to be encoded by referring only to frames in the GOP of interest without referring to a previous GOP, and the second compression method generating encoded data of the GOP of interest by referring not only to frames in the GOP of interest but also frames in the previous GOP; and performing control to record the video data acquired by the image sensor on a plurality of recording mediums, wherein in the performing control, on a first recording medium of the plurality of recording mediums, the video data acquired by the image sensor before a recording start instruction for a second recording medium of the plurality of recording mediums is input is recorded, and, on a second recording medium, the video data acquired by the image sensor in response to the recording start instruction for the second recording medium being input is recorded, wherein in the performing control, on the first recording medium, the video data in which all of GOPs are compression-encoded using the first compression method before the recording start instruction is input is recorded, and on the first recording medium and the second recording medium, the video data including video data compression-encoded using the second compression method after the recording start instruction is input.

9. A non-transitory computer-readable storage medium storing a program which, when read and executed by a computer, causes the computer to execute the steps of a method of controlling an image sensor, the method comprising:

capturing an image of a subject using an image capturing unit;

compression-encoding video data acquired by the image sensor in units of group of pictures (GOP), wherein in the compression-encoding, a first compression method or a second compression method is used, the first compression method generating encoded data of a GOP of interest to be encoded by referring only to fames in the GOP of interest without referring to a previous GOP, and the second compression method generating encoded data of the GOP of interest by referring not only to frames in the GOP of interest but also frames in the that is decoded with reference to a previous GOP; and performing control to record the video data acquired by the image sensor on a plurality of recording mediums, wherein in the performing control, on a first recording medium of the plurality of recording mediums, the video data acquired by the image sensor before a recording start instruction for a second recording medium of the plurality of recording medium is input is recorded, and, on a second recording medium, the video data acquired by the image sensor in response to the recording start instruction for the second recording medium being input is recorded, wherein in the performing control, on the first recording medium, the video data in which all of GOPs are compression-encoded using the first compression method before the recording start instruction is input is recorded, and on the first recording medium and the second recording medium, the video data compression-encoded using the second compression method after the recording start instruction is input.

10. The apparatus according to claim 1, wherein the first compression method is a method for a Closed GOP and the second compression method is a method for an Open GOP.

11. The apparatus according to claim 1, wherein, in the second compression method, even if a frame in the GOP of interest is an I frame, the frame is encoded by referring to frames in a GOP other than the GOP of interest.

* * * * *